United States Patent
Kleinschmit et al.

[11] Patent Number: 5,884,723
[45] Date of Patent: Mar. 23, 1999

[54] BEARING ARRANGEMENT OF AN AXLE TRANSMISSION CASE OF A MOTOR VEHICLE

[75] Inventors: Einhard Kleinschmit, Esslingen; Harald Reimold, Eppingen; Peter Tattermusch, Esslingen, all of Germany

[73] Assignee: Mercedes-Benz AG, Stuttgart, Germany

[21] Appl. No.: 870,838

[22] Filed: Jun. 6, 1997

[30] Foreign Application Priority Data

Jun. 15, 1996 [DE] Germany .................. 196 23 936.2

[51] Int. Cl.⁶ .................................................. B60K 17/16
[52] U.S. Cl. ............................................ 180/360; 180/378
[58] Field of Search ............................... 180/359, 360, 180/378

[56] References Cited

U.S. PATENT DOCUMENTS

| | | |
|---|---|---|
| 2,806,542 | 9/1957 | Scherenberg et al. . |
| 2,818,128 | 12/1957 | Uhlenhaut et al. . |
| 3,231,040 | 1/1966 | Blanchette .............. 180/378 |
| 3,603,421 | 9/1971 | Maeda et al. ............ 180/360 |
| 4,699,230 | 10/1987 | Solleder et al. ......... 180/360 |
| 4,779,834 | 10/1988 | Bittner . |
| 5,458,359 | 10/1995 | Brandt ..................... 180/378 |

FOREIGN PATENT DOCUMENTS

| | | |
|---|---|---|
| 875442 | 5/1953 | Germany . |
| 1430893 | 12/1968 | Germany . |
| DT1555176 | 9/1970 | Germany . |
| 2319943 | 11/1974 | Germany . |
| 4135361A1 | 4/1993 | Germany . |
| 2204839 | 11/1988 | United Kingdom . |

*Primary Examiner*—Kenneth R. Rice
*Attorney, Agent, or Firm*—Evenson McKeown Edwards & Lenahan, PLLC

[57] ABSTRACT

A bearing arrangement of a rear axle transmission case of a motor vehicle has a member frame having one respective linking at both ends of the transmission case situated in the driving direction which acts elastically in at least one direction. I order to have a softer construction with respect to its elasticity in the driving direction than in all other directions. The bearing takes place at least on one of the two ends of the transmission case exclusively by way of at least one lever which can be swivelled in a plane in parallel with respect to the vertical and longitudinal axis of the vehicle and which is linked in the direction of the vertical vehicle axis in mutually spaced positions to the transmission case and in the member frame. In this case at least the bearing arrangement of the lever in the member frame is implemented by means of at least one elastic bearing.

20 Claims, 4 Drawing Sheets

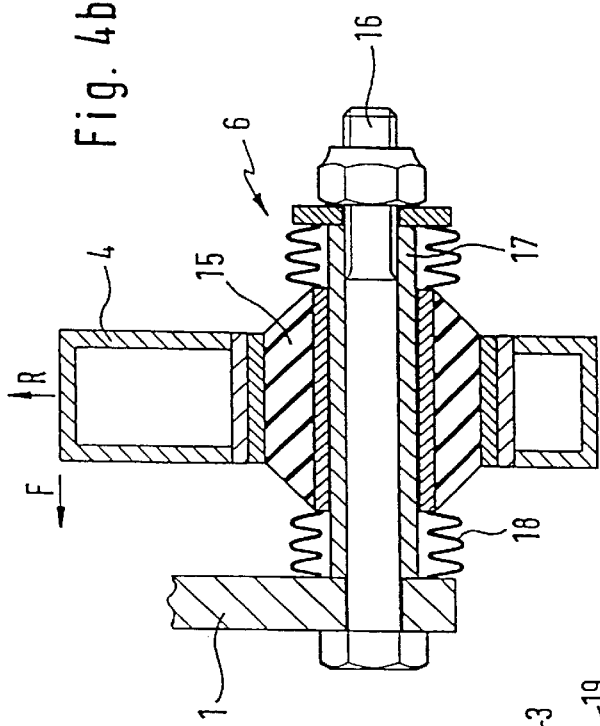
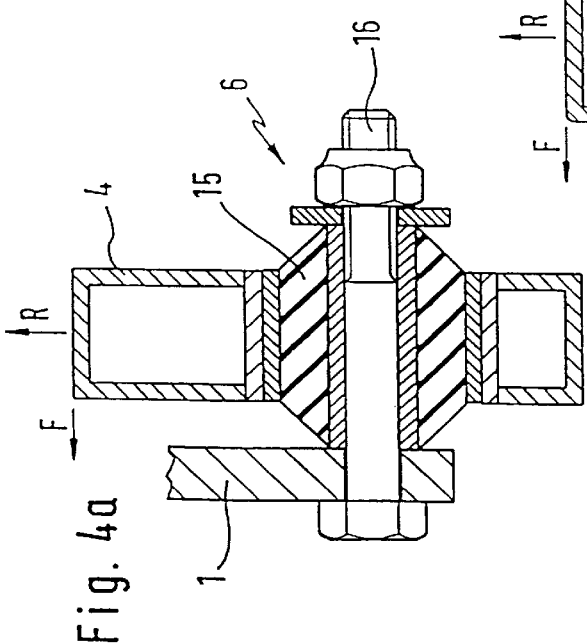
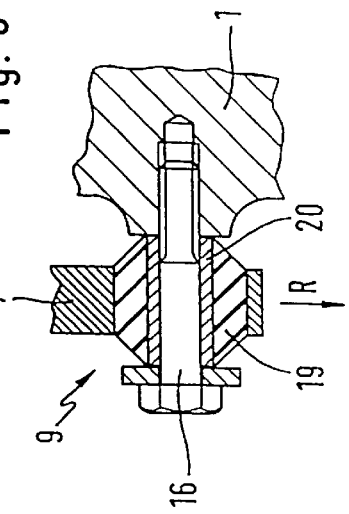
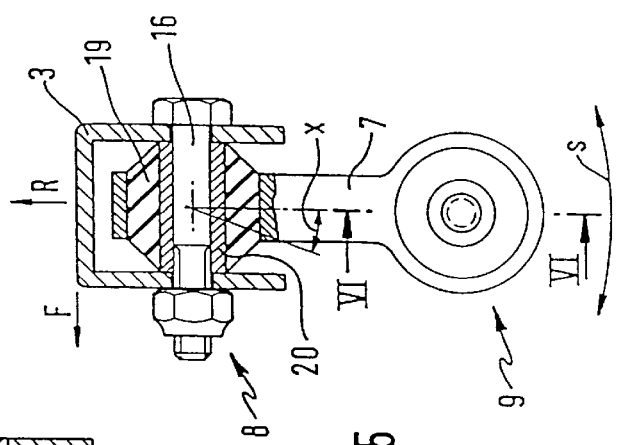

BEARING ARRANGEMENT OF AN AXLE TRANSMISSION CASE OF A MOTOR VEHICLE

BACKGROUND AND SUMMARY OF THE INVENTION

This application claims the priority of German application 196 23 936.2-12 filed on Jun. 15, 1996, the disclosure of which is expressly incorporated by reference herein.

The invention relates to a bearing of an axle transmission case of the type having a linking at both ends of the transmission cases to respective vehicle support frame members and having an elastic effect in at least one direction. Preferred embodiments relate to a bearing for an axle transmission case for a rear axle transmission.

Bearing arrangements of this general type are known, for example, from German Patent Document DE-OS 15 55 176 and British Patent Document GB 2 204 839A.

Based on the prior systems, the invention concerns the problem of making the bearing arrangement of the axle transmission softer, that is, more flexible, in the driving direction than in the other directions.

The invention provides a solution by providing a bearing of the above-mentioned type wherein the bearing takes place on one of the two ends of the transmission case exclusively by way of at least one lever which can be swivelled in a plane parallel to the vertical and longitudinal axis of the vehicle and which is linked in the direction of the vertical vehicle axis at mutually spaced linking points to the transmission case and to the member frame, at least the bearing of the lever with respect to the member frame taking place by way of at least one elastic bearing.

The invention is based on the idea of transmitting at least a portion of the forces occurring at the transmission case in the longitudinal direction of the vehicle by way of a lever which is swivellably disposed, on the one hand, in the member frame and, on the other hand, on the axle transmission case and in the process providing the linking points in the direction of the vertical axis of the vehicle in a mutually spaced manner. As a result, in the case of relatively slight deformations of the elastic bearing material within the bearings of the member frame by way of the lever arm effect of the lever, increased deflections can be achieved in the longitudinal direction of the vehicle on the other end of the lever swivellably connected with the transmission case. In the other directions, in which the bearings within the member frame are not loaded by way of a lever arm originating from the lever, they behave according to the elasticity of their bearing materials; that is, they behave more stiffly in these directions because they are not stressed there by way of a lever arm. The bearing which connects the lever with the transmission case may be a purely inelastic pivot bearing according to certain contemplated embodiments. In this case, the elasticity of the bearing arrangement originates only from the linking of the lever to the concerned cross member. If the lever is connected with the transmission case by way of several bearings, all of these bearings can be inelastic pivot bearings in the above-mentioned sense.

According to certain preferred embodiments, the lever can have a U-shaped construction and can reach around the transmission case by means of its U-legs.

According to certain preferred embodiments, the member frame can either be elastically or fixedly connected with the vehicle body. In the case of a fixed connection, it may be an integrated component of the vehicle body and therefore represent a constructively simple solution which is only slightly less comfortable than an elastic linking.

In particularly expedient embodiments, a part of the member frame, specifically the cross member situated in front of the axle transmission in the driving direction, as a whole, is used as the lever according to the invention in that the cross member is connected on its longitudinal ends by way of elastic bearings with the side members of the member frame.

The elastic linking of the member frame to the vehicle body, on the one hand, and an elastic linking according to the invention of the forward cross member to the side members to which the vehicle wheels are linked which are assigned to the transmission case, on the other hand, in the case of forces exercised by the road onto the wheels, particularly lateral forces during cornering, permits an elastic lateral bending of the side members in the area of the forward cross member. As a result, the wheels coupled to the concerned side members are adjusted during cornering in the direction of an understeering.

Other objects, advantages and novel features of the present invention will become apparent from the following detailed description of the invention when considered in conjunction with the accompanying drawings.

BRIEF DESCRIPTION OF THE DRAWINGS

FIG. 4a is a perspective sectional view of a first embodiment of an elastic bearing taken along Line IVa—IVa and IVb—IVb in FIG. 1;

FIG. 4b is a perspective sectional view of a second embodiment of an elastic bearing taken along Line IVa—IVa and IVb—IVb in FIG. 1;

FIG. 5 is a perspective sectional view of an elastic bearing taken along to Line V—V in FIG. 1;

FIG. 6 is a perspective sectional view of an elastic bearing taken along Line VI—VI in FIG. 5.

DETAILED DESCRIPTION OF THE DRAWINGS

Figure 1:
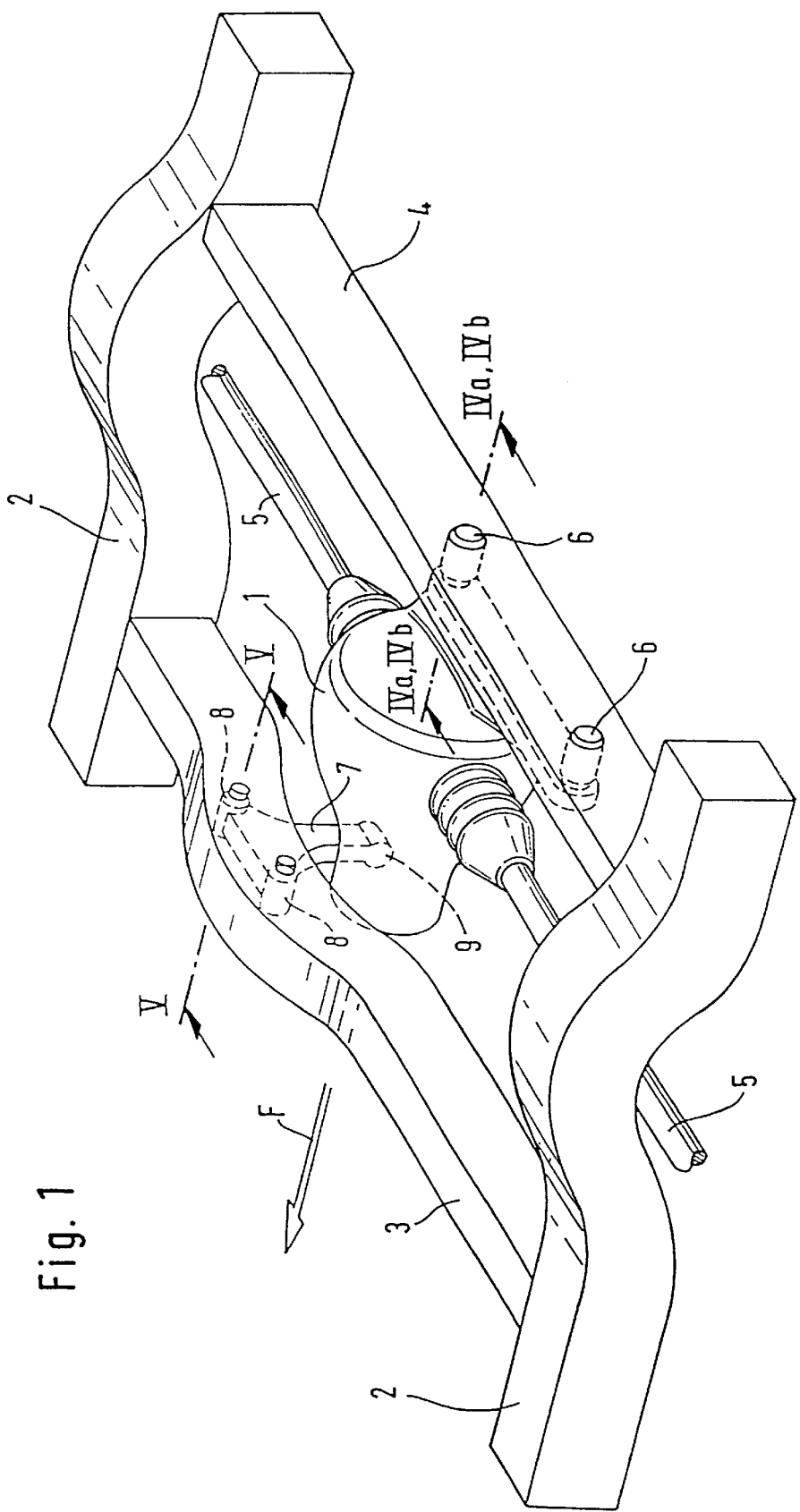
FIG. 1 is a perspective view of the suspension of a rear axle transmission case by way of an articulated lever with a one-sided bearing arrangement of this lever on the transmission case.

A member frame for an elastic bearing arrangement of the transmission case 1 of a rear axle transmission of a vehicle has two side members 2 as well as two cross members, specifically a cross member 3 which is in the front in the forward driving direction and a rearward cross member 4. The forward driving direction of the vehicle to whose body the member frame, in particular, is elastically linked, is indicated in the drawings by one arrow F respectively. The drive cardan shaft leads into the transmission case 1 on the side of the forward cross member 3. In the rearward area of this transmission case 1, drive shafts 5 for drivable wheels of the vehicle are coupled. These wheels are coupled between the cross members 3 and 4 to the side members 2 in a manner not shown in the drawing.

The suspension of the transmission case 1 takes place elastically on both cross members 3 and 4.

In the embodiment according to FIG. 1, the transmission case 1 is linked in a vehicle plane, that is, in a plane extending perpendicularly to the vertical axis of the vehicle, twice to the rearward cross member 4 by way of elastic bearings 6 spaced in this plane in the transverse direction of the vehicle. As a result of this double bearing arrangement, an absorbing of the drive torques acting upon the transmission case 1 can be achieved.

A lever 7 is provided for the bearing arrangement of the transmission case situated in the front in the driving direction. This lever 7 is linked to the forward cross member 3 by way of elastic bearings 8 situated spaced laterally from one another in the vehicle plane defined above. A bearing 9 with a pivot axis aligned horizontally transversely to the driving direction is used for the linking to the other end of the lever 7 in the direction of the vertical axis of the vehicle. This bearing 9 may be constructed as an elastically acting bearing or as a purely inelastically acting pivot bearing. In the last-mentioned case, the elasticity of the bearing arrangement must be applied only by the bearings 8.

The lever 7 acts between the bearings 8 and 9 as a lever arm with respect to the elastic linking of the transmission case 1 on the forward cross member 3. Because of the effect of this lever arm, a displacement path can be achieved on the bearing or bearings 9 in the longitudinal direction of the vehicle which is enlarged with respect to the deforming of the elastic material within the bearings 8. This effect will be explained in greater detail in a description of a bearing arrangement of the lever 7 between the transmission case 1 and the forward cross member 3 illustrated in FIG. 5.

The elastic bearings 6 on the rearward cross member 4 must be correspondingly coordinated with the soft longitudinal bearing arrangement which can be achieved by the bearing arrangement by way of the lever 7 of the transmission case 1. As an example of bearings to be coordinated in such a manner, respective thrust rubber bearings are illustrated in FIG. 4a. In the case of this bearing, a double sleeve, which is filled in a force-locking manner with rubber as an elastomer, is fixedly connected with the rearward cross member 4. A double sleeve is an outer sleeve with an inner sleeve which is coaxially arranged thereto. The inner sleeve of this double sleeve is fixedly connected with a bracket of the transmission case by means of a tightening screw 16. In the case of the bearing 6 constructed in this manner, longitudinal and transverse displacements take place within the elastomer 15. With respect to its elastic deformability, such a bearing is designed such that this deformability is higher in the driving direction F than in directions R extending perpendicularly thereto.

It is also contemplated to apply the elastic bearing arrangement in the driving direction only by the elastic bearings 8—optionally together with one or several bearings 9 if these have an elastic swivel resistance—to the forward cross member 3 and to design the elastic bearings 6 on the rearward cross member 4 to be freely displaceable in the driving direction F. Such a bearing construction is illustrated in FIG. 4b. There, a double sleeve, which is also filled with an elastomer 15 in a force-locking manner, is fixedly disposed in the rearward cross member 4 only radially on the outside, while, radially on the inside, it is disposed sliding in the driving direction F on a slide bush 17. By way of a tightening screw 16, the slide bush 17 is fixedly connection with a bracket of the transmission case 1. The slide surface of the slide bush 17 is protected against contamination in its areas which come to be situated outside the double sleeve in each case by means of a cushion-type seal 18 which is clamped between the tightening screw 16 and the double sleeve.

The construction of the bearings 8 and 9 is illustrated in FIG. 5 (bearings 8 and 9) and in FIG. 6 (bearing 9). The bearings 8 behave elastically on all sides and permit particularly swivel movements in a plane with respect to the longitudinal axis of the vehicle and the vertical axis of the vehicle or in a plane parallel thereto. At the ends of the lever 7 which, in each case, lead into a bearing 8, one eye respectively is molded into the lever 7 and is filled with an elastomer ring 19 in a force-locking manner. This elastomer ring 19, in turn, is connected in a force-locking manner with a radially interior sleeve 20. The sleeve 20 of a bearing 8 is in each case fixedly connected with the forward cross member 3 by way of a tightening screw 16. The swivelling takes place by an elastic deformation of material inside the elastomer ring 19. An identically constructed individual bearing 9 is provided on the other end of the lever 7. The bearing 9 may also be constructed such that it can absorb swivel movement of the lever 7 without an elastic deformation of the elastomer material 19. In this case, the sleeve 20 of this bearing 9 is not clamped on the face so that it can rotate freely on the tightening screw 16.

The displacement path which can be achieved by a swivelling of the lever 7 in the area of the bearing 9 connecting the lever 7 with the transmission case 1 by way of the lever arm originating from the lever 7 and which is increased in comparison to the deformation of the elastic material of the bearings 8 is indicated by an x in FIG. 5. The double arrow S added there indicates the swivel path of the lever 7.

A bearing arrangement of the transmission case 1 within the member frame which is softer in the driving direction than in all other directions in the case of a bearing arrangement by means a lever 7 on the forward cross member 3 can be supplemented and improved in the case of the bearing arrangement on the rearward cross member 4 by way of a leaf spring aligned in the vehicle plane defined above transversely with respect to the longitudinal axis of the vehicle. For example, in the case of a bearing according to FIG. 4b, such a leaf spring can be fixedly connected with the double sleeve filled by an elastomer 15. The free displaceability of this double sleeve will then be controlled by the spring force of the leaf spring. Such a leaf spring which is not shown in the drawing is used exclusively for controlling the bearing elasticities in the driving direction.

Figure 2:
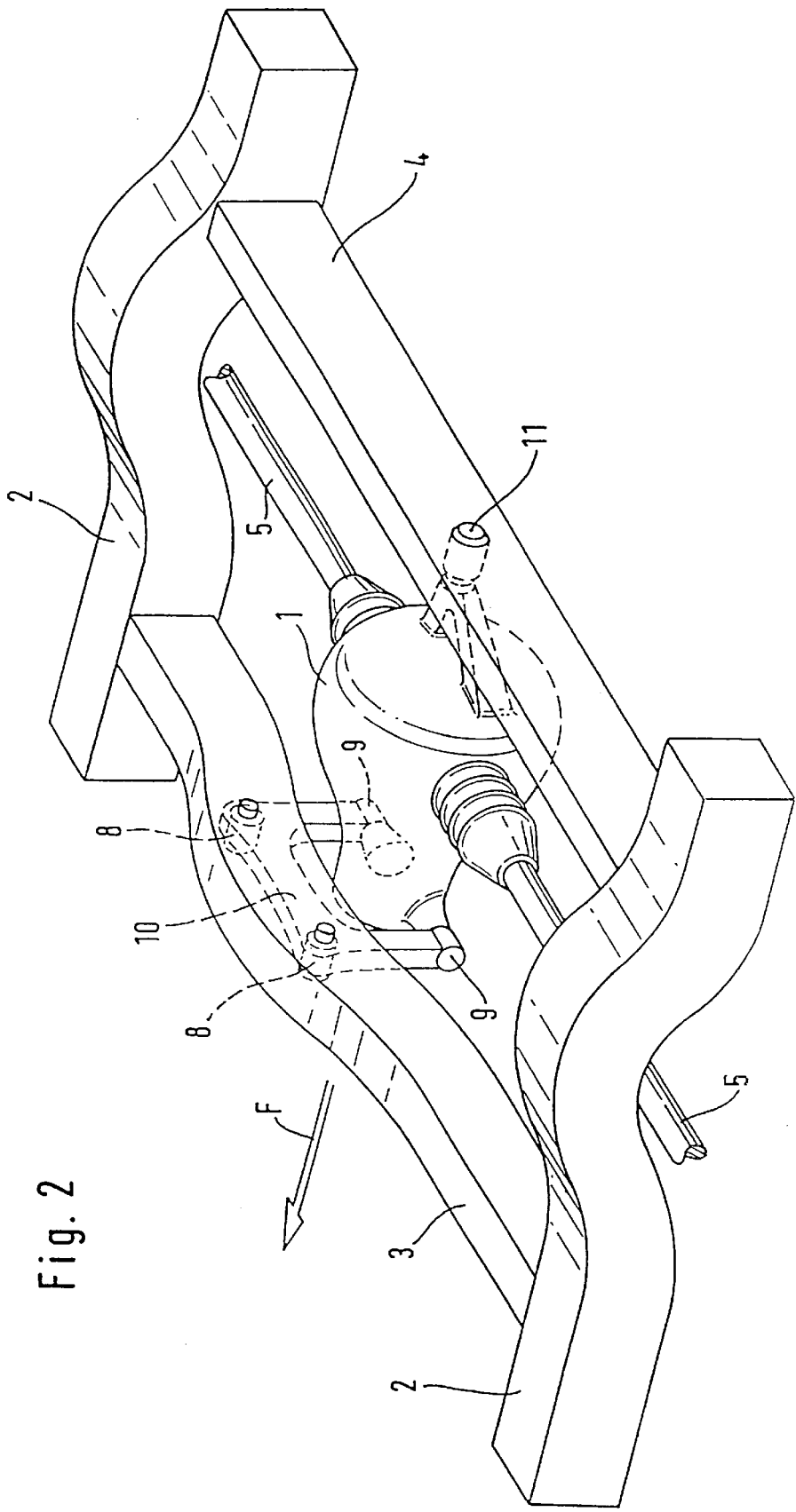
FIG. 2 is a perspective view of an alternative transmission case bearing arrangement, having an articulated lever linked on two sides to the transmission case.

In the embodiment according to FIG. 2, the suspension of the transmission case 1 differs from that according to FIG. 1 in principle only in that a double bearing which is mutually spaced in the transverse direction which is required in the above-defined vehicle plane in the transverse direction for supporting the drive torque takes place on the forward cross member 3 instead of on the rearward cross member 4. For this purpose, the lever is constructed there as a U-shaped lever 10, the free legs of the U reaching around the transmission case 1 and being swivellably connected on their respective ends with the transmission case 1. In this case, only an elastic bearing arrangement is situated on the rearward cross member 4. This bearing 11 may have a construction according to FIG. 4a or 4b. The bearings 8 and 9 may correspond to those according to FIG. 5 and 6.

Figure 3:
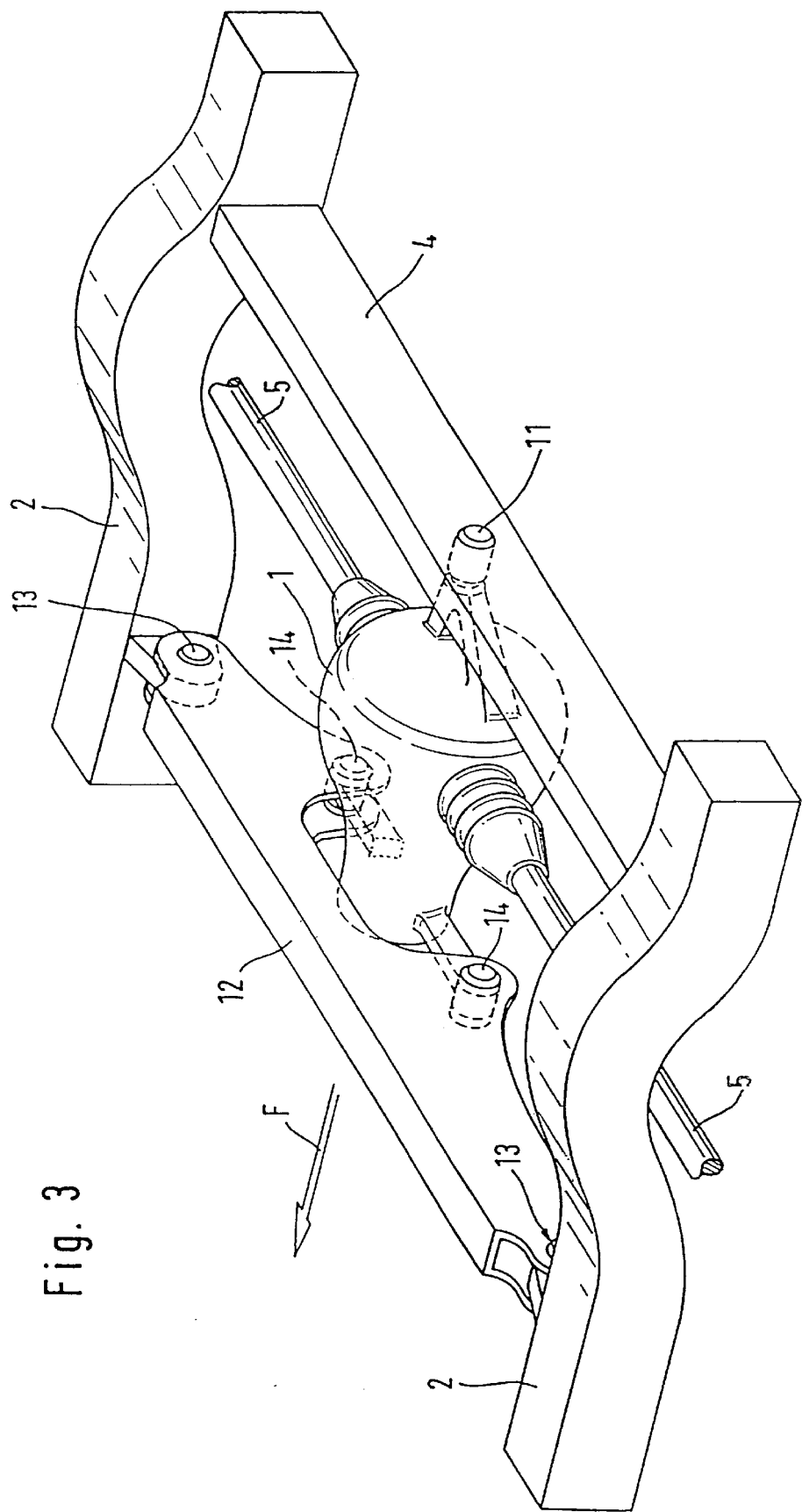
FIG. 3 is a perspective view of a further alternative transmission case bearing arrangement having an articulated lever used as the cross member of the member frame of the transmission case.

A further development of the construction according to FIG. 2 is illustrated in FIG. 3. There, the forward cross member 12 as such forms the lever according to the invention for the forward bearing arrangement of the transmission case 1. In order to achieve a two-sided bearing arrangement of the transmission case 1 on the cross member in the initially defined vehicle plane, the cross member reaches in a U-shape around the forward part of the transmission case 1. At the free ends of the U-leg, the cross member 12 is elastically linked by way of bearings 14 in a manner of, for example, the bearings 9 in FIG. 5 to the transmission case 1. In order to be able to operate as a lever in the sense of the invention, the forward cross member 12 is disposed on its ends on the two side members 2 in each case elastically by way of bearings provided there. These bearings may correspond to the bearings 8 according to FIG. 5.

The elastic connection between the forward cross member 12 and the two side members 2 of the member frame not only has the advantages according to the invention with respect to the transmission case bearing arrangement but also has an additional advantage for the vehicle handling. This is because the wheels are linked to the side members, in which case a certain transverse flexibility in the area of the forward cross member 12 in the case of forces introduced into the wheels by the road, particularly lateral forces during cornering, can result in an improvement of the alignment conditions of the vehicle. Thus, the lateral forces introduced during a cornering by way of the wheels into the side members result in an adjustment of the wheels in the direction of an understeering of the vehicle. It is a prerequisite of such an effect that the side members 2 are elastically fastened to the vehicle body. The reason is that only this will permit a transverse bending of the side members 2 in the area of the forward cross members 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Bearing arrangement of an axle transmission case, of a motor vehicle in a member frame having one respective linking to both ends of the transmission case situated in the driving direction which has an elastic effect in at least one direction, wherein the bearing takes place on one of the two ends of the transmission case exclusively by way of at least one lever which can be swivelled in a plane parallel to the vertical and longitudinal axis of the vehicle and which is linked in the direction of the vertical vehicle axis at mutually spaced linking points to the transmission case and to the member frame, at least the bearing of the lever with respect to the member frame taking place by way of at least one elastic bearing.

2. Bearing arrangement according to claim 1, wherein the lever has a U-shaped construction, having U-legs which extend in a direction of a vertical axis of the vehicle and which enclose the transmission case between one another.

3. Bearing arrangement according to claim 1, wherein the member frame is elastically connected with the vehicle body.

4. Bearing arrangement according to claim 2, wherein the member frame is elastically connected with the vehicle body.

5. Bearing arrangement according to claim 1, wherein the member frame is a fixed integrated component of the vehicle body.

6. Bearing arrangement according to claim 2, wherein the member frame is a fixed integrated component of the vehicle body.

7. Bearing arrangement according to claim 1, wherein the linking is provided by way of the lever to an end of the transmission case which is in the front in the driving direction and this lever is constructed as a forward cross member of the member frame which has another rearward cross member which is situated behind the transmission case in the driving direction.

8. Bearing arrangement according to claim 7, wherein the vehicle wheels assigned to the transmission case are linked to side members of the member frame between forward and rearward cross members of the member frame.

9. Bearing arrangement according to claim 3, wherein the linking is provided by way of the lever to an end of the transmission case which is in the front in the driving direction and this lever is constructed as a forward cross member of the member frame which has another rearward cross member which is situated behind the transmission case in the driving direction.

10. Bearing arrangement according to claim 9, wherein the vehicle wheels assigned to the transmission case are linked to side members of the member frame between forward and rearward cross members of the member frame.

11. Bearing arrangement according to claim 1, wherein said axle transmission case is a rear axle transmission case.

12. Bearing arrangement according to claim 2, wherein said axle transmission case is a rear axle transmission case.

13. Bearing arrangement according to claim 3, wherein said axle transmission case is a rear axle transmission case.

14. Bearing arrangement according to claim 5, wherein said axle transmission case is a rear axle transmission case.

15. Bearing arrangement according to claim 7, wherein said axle transmission case is a rear axle transmission case.

16. A motor vehicle assembly comprising:

a member frame including a pair of laterally spaced apart side members and front and rear longitudinally spaced apart cross members connected at said side members, an axle transmission case disposed intermediate the cross members and supported at said members frame by respective front and rear bearing assemblies, wherein one of said bearing assemblies includes a lever connected to said transmission case and to said member frame at vertically spaced connection points and an elastic bearing provided at least one of said connection points.

17. A motor vehicle assembly according to claim 16, wherein said axle transmission case is a rear axle to transmission case.

18. A motor vehicle assembly according to claim 17, wherein said side members and said cross members are rigidly connected together, and wherein said lever is connected between the forward cross member and the casing.

19. A motor vehicle assembly according to claim 18, wherein the lever has a U-shaped construction, having U-legs which extend in a direction of a vertical axis of the vehicle and which enclose the transmission case between one another.

20. A motor vehicle assembly according to claim 17, wherein the side members and the rear cross member are rigidly connected together, and wherein the forward cross member forms said lever.

* * * * *